March 7, 1967 T. A. RUBLE 3,307,923
PROCESS AND APPARATUS FOR MAKING CARBON BLACK
Filed Dec. 9, 1964
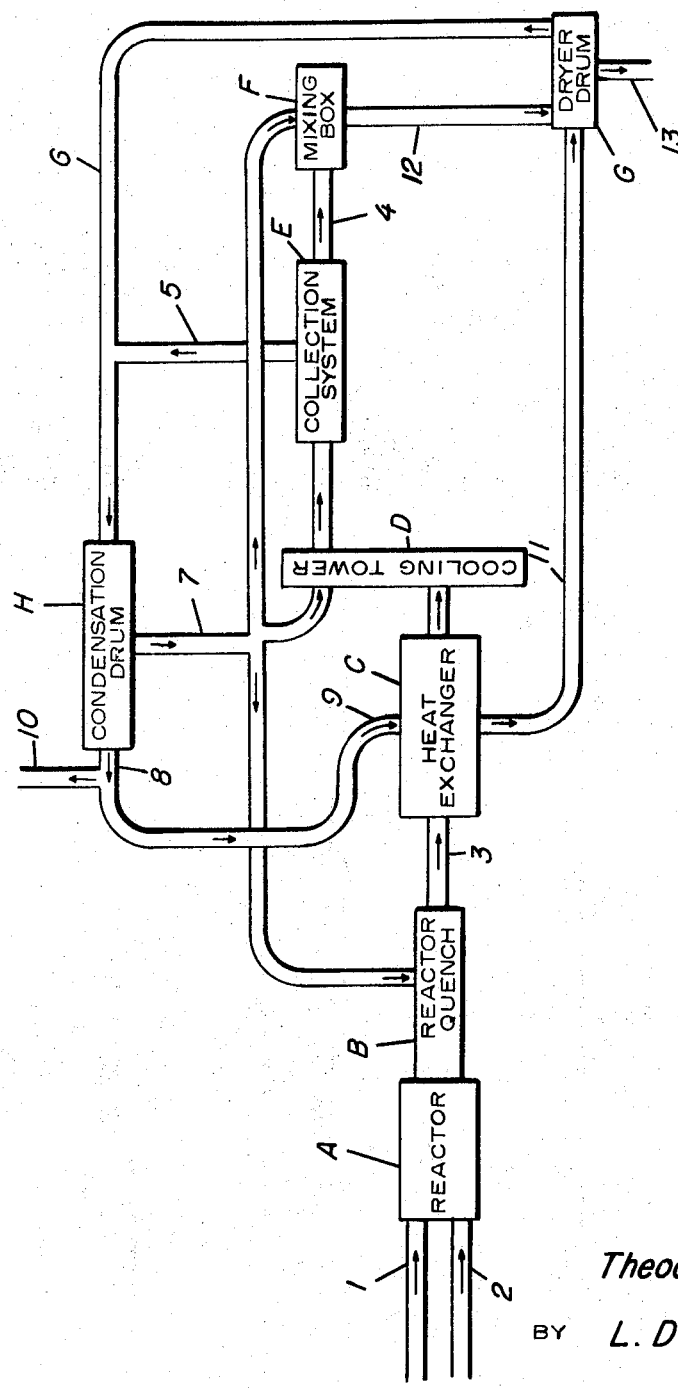
INVENTOR
*Theodore A. Ruble*
BY *L. David Trapnell*
ATTORNEY

United States Patent Office 3,307,923
Patented Mar. 7, 1967

3,307,923
PROCESS AND APPARATUS FOR MAKING
CARBON BLACK
Theodore A. Ruble, Houston, Tex., assignor to Continental Carbon Company, Houston, Tex., a corporation of Delaware
Filed Dec. 9, 1964, Ser. No. 417,158
4 Claims. (Cl. 23—314)

This invention relates to the making of carbon black and particularly to a novel and improved system wherein the heat and water components are conserved and the pellets are dried with a drying gas of improved quality.

According to the usual practice pelletized carbon black is produced by (1) Conducting the cracking of the hydrocarbon feedstock in a reactor to obtain a hot gaseous effluent;

(2) Reducing the temperature of the hot gaseous effluent with a direct water quench adjacent to and downstream from the reactor;

(3) Further reducing the temperature of the effluent in a quench tower prior to passing into a collection system;

(4) Passing the cooled effluent to a collection system wherein the solid carbon black is recovered;

(5) Wet pelletizing the solid carbon black in a mixing box; and (6) Passing the wet pellets to a drum dryer wherein the water is driven off and the pellets are ready for whatever usage they are intended.

The conventional wet pelletizing operation required an extraneous supply of water to the mixing box.

The drum dryer is conventionally operated by burning a fuel gas with excess air and passing the hot combustion products, which contain up to 15 percent oxygen, through the dryer.

Accordingly, none of the heat from the reactor is utilized; and the quench water is passed to the atmosphere as steam.

The present invention achieves various improvements over the aforementioned prior art practices, including The provision of a heated gas for charging through the drum dryer which is essentially an oxygen free gas, thereby avoiding any oxidation of the carbon black pellets being dried therein;

The utilization of the heat from the carbon black reactor which ordinarily is exhausted to the atmosphere;

The utilization in the quench and pelletizing systems of water which is recovered from the collection system effluent;

The reduction of the ash content of the pelleted carbon black through the use of the recovered condensate which is free of dissolved solids; and The improvement of the carbon free gaseous effluent as a low heat content fuel by decreasing the water vapor content.

The foregoing and other objects will be more fully understood as this description proceeds, the same to be read in conjunction with the annexed drawing wherein the single figure diagrammatically represents one form of apparatus which may be employed to attain the teachings of the present invention.

Referring more particularly to the drawing, the letter A indicates a carbon black reactor into which there is charged a hydrocarbon feedstock 1 and a combustible gaseous medium 2.

The hot gaseous effluent, containing the carbon, resulting from the combustion reaction in the reactor A is quenched by direct water spray in the reactor quench B and is shown at 3 as moving into and through a heat exchanger C and then into a cooling tower D before entering the collection system E.

In the manner well known in the art, the hot gaseous effluent which is produced in reactor A is quenched in the reactor quench B and further cooled in cooling tower D, and separated into particulate carbon black 4 and clean effluent gas, containing water vapors, 5.

From the collection system E the particulate carbon black 4 is transferred to a mixing box or wet pelletizer F wherein water is introduced and wet carbon black pellets are formed.

As previously mentioned, the effluent gas from the collection system (which contains water vapors in substantial quantity) is usually exhausted to the atmosphere.

According to the teachings of the present invention there is provided a condensation drum H which receives the wet gaseous effluent 5 from the collection system combined with the wet gas 6 from the dryer drum G. Within the condensation drum H cooling is applied (in well known manner) to separate the water and the effluent gases. The water 7 which results from this step is distributed to the mixing box or wet pelletizer F, the reactor quench B, and the cooling tower D; and the desired portion 9 of the dried effluent gas 8 is passed to the jacket of the heat exchanger B. The remainder of the dried effluent gas 10 is removed from the condensation drum H in any suitable manner and may be used as a low heat content fuel gas.

While in the jacket of the heat exchanger C the temperature of the dry effluent gas 9 can be elevated to as high as 1000° F. depending upon the requirement of the product.

The heated and dry effluent gas is shown at 11 as passing from the heat exchanger C to a drum dryer G which receives the wet pellets 12 from the mixing box or wet pelletizer F. This provides the drum dryer G with a hot dry oxygen-free gas, thereby avoiding the usual procurement and combustion of a separate drying gas which contains undesired oxygen. It is well known in the art that oxidation of carbon black considerably changes its characteristics, particularly surface area and surface chemistry thus rendering it unfit for use in many rubber compounds. The use of the oxygen-free gas of the present invention eliminates oxidation of the carbon black pellets in the drum drying operation, thereby conserving the desired properties of the carbon black 13 and improving the output of the plant through greater efficiency.

As will be seen from the foregoing, the present invention provides a process and apparatus for making pelletized carbon black wherein the components are so disposed with respect to each as to improve the quality of the heated gas passed through the dryer drum, to conserve and improve the quality of the water which is used, and to conserve the quality of the dried carbon black pellets produced.

Whereas conventional plants for making pelletized carbon black include a reactor, reactor quench, cooling tower, collection system, pelletizing operation, and drum dryer, the carbon black system disclosed herein and claimed hereinafter includes a heat exchanger in conjunction with the reactor quench; and a condensation drum between and communicating with the heat exchanger and the collection system, the gas from the collection system and the dryer drum being passed to the condensation drum for recovery of the water which is then distributed to the pelletizer, the reactor quench and the cooling tower, and the oxygen free gas being passed to the heat exchanger and thence to the drum dryer.

Having thus disclosed the invention, what I claim as novel and desire to secure by Letters Patent is:

1. A process for making pelletized carbon black which includes obtaining a hot gaseous effluent containing suspended carbon black from a reactor with a water quench connected thereto; passing the hot gaseous effluent through a heat exchanger having heating and heated portions; passing the hot gaseous effluent containing the carbon black from the heat exchanger through a cooling tower to a collection system wherein particulate carbon black is separated from the gaseous effluent; passing the particulate carbon black from the collection system to a mixing box wherein is wet pelletized; passing the wet pellets to a pellet dryer; passing the clean effluent gases from the collection system to a condenser; passing the dried clean effluent gases from the condenser to the heated portion of the heat exchanger wherein the temperature is substantially raised; and passing the dried clean effluent from the heated portion of the jacket of the heat exchanger to the pellet dryer.

2. A process for making pelletized carbon black which includes obtaining a hot gaseous effluent containing the suspended carbon black from a carbon black reactor which has a quench section connected thereto; passing the hot gaseous effluent through a heat exchanger having heating and heated portions; passing the hot gaseous effluent containing carbon from the heating portion of the heat exchanger through a cooling tower to a collection system wherein particulate carbon black is separated from the gaseous effluent; passing the particulate carbon black from the collection system to a mixing box wherein it is wet pelletized; passing the wet pellets to a pellet dryer; passing the clean gaseous effluent from the collection system to a condenser wherein water is recovered from the water vapors contained therein; passing the recovered water from the condenser to the reactor quench, the cooling tower and the mixing box; passing the dried clean gaseous effluent from the condenser to the heated portion of the heat exchanger wherein the temperature is substantially raised; and passing the dried gaseous effluent from the heated portion of the heat exchanger to the pellet dryer.

3. A process for making pelletized carbon black which includes obtaining a hot gaseous effluent containing the suspended carbon black from a carbon black reactor which has a reactor quench connected thereto; passing the hot gaseous effluent through a heat exchanger having heating and heated portions; passing the hot gaseous containing carbon from the heating portion of the heat exchanger through a cooling tower to a collection system wherein particulate carbon black is separated from the gaseous effluent; passing the particulate carbon black from the collection system to a mixing box wherein it is wet pelletized; passing the wet pellets to a pellet dryer; passing the clean gaseous effluent from the collection system to a condenser; passing the gaseous effluent from the pellet dryer to the same condenser wherein water is recovered from the water vapors contained therein; passing the recovered water from the condenser to the reactor quench, the cooling tower and the mixing box; passing the dried clean gaseous effluent from the condenser to the heated portion of the heat exchanger wherein the temperature is substantially raised; and passing the dried gaseous effluent from the heated portion of the heat exchanger to the pellet dryer.

4. Apparatus for making pelletized carbon black comprising a carbon black reactor with a reactor quench attached thereto; a heat exchanger having heating and heated portions; the inlet of the heating portion of said heat exchanger communicating with the downstream end of the reactor quench attached to the carbon black reactor; a cooling tower communicating with the outlet of the heating portion of the heat exchanger; a collection system communicating with the outlet end of the cooling tower; a wet pelletizer communicating with the carbon black discharge of the collection system; a pellet dryer communicating with said wet pelletizer; a condenser; means for passing the clean gaseous effluent from the said collection system to said condenser; means for passing gaseous effluent from pellet dryer to condenser; means for passing the water recovered in said condenser to said reactor quench, cooling tower, and wet pelletizer; means for passing dried gaseous effluent from said condenser to the inlet of the heated portion of said heat exchanger; and means for passing the heated dry gaseous effluent from the outlet of the heated portion of said heat exchanger to said pellet dryer.

References Cited by the Examiner
UNITED STATES PATENTS

| 2,457,962 | 1/1949 | Whaley | 23—314 |
| 3,116,119 | 12/1963 | Osburn | 23—314 |

FOREIGN PATENTS 160,298   8/1957   Sweden.

References Cited by the Applicant
UNITED STATES PATENTS

Re. 21,302   12/1939   Grote.
2,066,274   12/1936   Grote.

NORMAN YUDKOFF, *Primary Examiner.*

G. HINES, *Assistant Examiner.*